United States Patent Office 3,263,782
Patented August 2, 1966

3,263,782
TRANSMISSION CONTROL AND CLUTCH
Richard L. Smirl, La Grange, Miczyslaw J. Waclawek, Olympia Fields, and John W. Adelman and Edward F. La Buda, Chicago, Ill., assignors to Borg-Warner Corporation, Chicago, Ill., a corporation of Illinois
Filed Aug. 2, 1961, Ser. No. 128,916
16 Claims. (Cl. 192—3.5)

This invention relates to automatic clutch control mechanisms and more particularly to actuating means cooperating with an internal combustion engine for normally automatically engaging the clutch mechanism in response to engine speed and torque, and for automatically disengaging and reengaging the clutch mechanism in response to transmission shift means.

In the past few years, the trend in the automotive industry has been toward fully automatic transmissions. In most cases these automatic transmissions are quite different from conventional counter-shaft transmissions which were used in most automobiles in the past and still are used in many today. Although the recently developed automatic transmissions make the driving of an automotive vehicle substantially easier and have met with widespread acceptance, such transmissions are much more expensive to produce than the conventional counter-shaft transmissions, partly because of the more complicated constructions usually including some sort of hydraulic coupling, and also because of the complicated control mechanisms. In addition, somewhat more engine power is absorbed by an automatic transmission through the hydraulic coupling, the automatic engaging devices and the more complicated gearing arrangements.

The clutch control system of the present invention is intended to provide most of the advantages of an automatic transmission, as well as the economy of a conventional clutch installation, by utilizing a conventional counter-shaft transmission in connection with a power actuated clutch. As with certain other automatic clutch systems, the need for a conventional clutch pedal is eliminated entirely. However, by a simplified unique arrangement, the operation of the instant non-pedal system provides for unprecedented smooth engagement and disengagement of the clutch under all operating conditions and avoiding any lurching of the vehicle. It simplifies road-handling of a vehicle having an automatic clutch and is, therefore, valuable not only to the beginning driver but also to the experienced driver. It allows the latter considerable scope for exercising his individual style of driving since the actual process of gear changing is still under his personal control.

In U.S. Patent No. 2,893,526, by R. L. Smirl, one of the co-inventors of the present invention, a basic disclosure of the instant type of clutch control system was made; such patent shall be hereinafter referred to as the original disclosure. The instant invention is, therefore, directed to novel improvements over such construction and has as a primary object the provision of an improved clutch control system that is more effective to automatically disengage the clutch during the gear shifting operation and which permits more smooth and rapid reengagement after the gear shifting operation has been completed for all driving conditions.

Similarly in the broad aspects of the invention, it contemplates provision of a clutch control mechanism which completely and without effort actuates a clutch device in response to *all* change-of-gear operations initiated by the gearshift lever; such universality of automatic operation is not known to the prior art or displayed by the original disclosure. No longer is there definite need for releasing the accelerator pedal during any gear change. The action of slightly and initially moving the gearshift lever causes instant disengagement of the clutch so that gear changing necessitates exertion of a lesser degree of physical manipulation than with the construction of the original disclosure and is accomplished more quickly. Upon completing positioning of the gearshift lever, the clutch reengages more smoothly and under automatic control to insure that the action is perfectly matched to the driving conditions prevailing at the time. During traffic stops it is not necessary to wait in neutral. The transmission may be easily shifted directly from high to low just before or after coming to a complete stop and it is not necessary at normal idle speed to hold the brake pedal to avoid creep after stopping.

Another object is to provide a more economical and durable clutch control mechanism than prior systems while at the same time providing for more quick response to the needs of the driver. Pursuant to the needs of economy and durability, the mechanism comprises a hydraulic servo-motor energized by fluid pressure from the engine lubricating system and has a primary control valve means responsive both to engine speed and to manifold vacuum for controlling the supply of fluid to the servo-motor; the valve means is uniquely adapted to provide a more compact construction and eliminates the need for extended mechanical linkage between the accelerator pedal and the valve means as required by the original disclosure. Pursuant to the needs of quicker response, the servo-motor is served by a novel three-stage volumetric phasing means effective to permit rapid initial filling of said servo-motor for initially engaging the clutch and thereafter restricting the rate of filling of said servo-motor for permitting gradual pressure build-up while increasing the engaging pressure of said clutch. This gives the engine time to accelerate slightly above the transmission input speed after each shift to avoid the feel of a torque reversal, and permits reserve pressure to be employed without harshness or abruptness in the engagement. This phasing means obviates the need for several extended hydraulic parts which have attempted to serve the same purpose.

Still another object of the present invention is to provide means for producing a light residual clutch engagement to take up the drive-line backlash in order to avoid a drive-line thump when the throttle is opened to start the car in motion; such means is adapted also to initiate clutch engagement when shifting to a lower gear at closed throttle for hill braking and engine braking while coasting on a level. Furthermore, when braking under ordinary conditions by use of the vehicle's brakes, the engine at first assists the braking action in the usual manner, but before the engine begins to "falter," the clutch disengages automatically so that all risk of stalling the engine is avoided.

Still another object of this invention is to provide a clutch control mechanism including an electrically operated dump valve for controlling fluid flow to a portion of a vacuum-operated modulating means, the electrically operated dump valve being interconnected with the vehicle ignition system and being effective to prevent starting of the vehicle engine while in gear. Such electrically operated valve provides for more quick and positive employment of the vacuum-operated modulator.

Yet another object is the provision of improved switch means cooperating in a unique manner with the gear shifting mechanism for operating the electrically actuated dump valve; the switch means includes a novel lost-motion connection with the gear shift linkage and a unique over-center mechanism for preventing the inadvertent actuation of the switch means due to engine vibration and the like. During gear changes, initial movement of the shift lever releases the clutch quickly by actuating the micro-switch which in turn actuates the dump valve. Completion of the shift reestablishes the clutch pressure according to the torque of the engine at that moment.

In addition, the present invention is particularly adaptable for use with a transaxle transmission which would ordinarily require a long linkage between the clutch pedal and the clutch and transmission assembly.

The invention consists of the novel constructions, arrangements and devices to be hereinafter described and claimed for carrying out the above-stated objects and such other objects as will appear from the following description of a preferred form and alternative constructions of the invention illustrated with reference to the accompanying drawings, wherein:

*General arrangement and working principle*

Figures 1, 2:
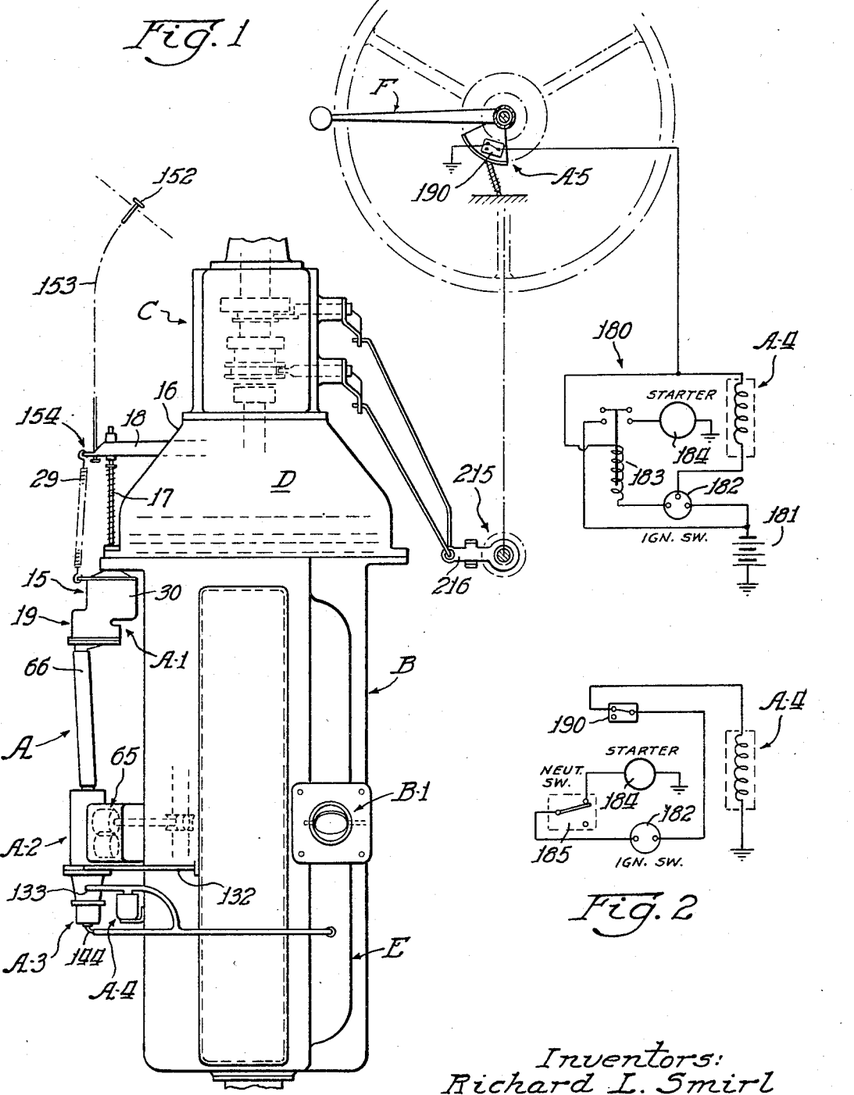
FIG. 1 is a plan view of a typical automobile power unit shown in conjunction with a schematic representation of a steering and gear-shifting mechanism and ignition system, the novel clutch control mechanism of this invention being illustrated as incorporated therewith.
FIG. 2 is a schematic illustration of an alternative electrical energizing system for the electrical control system of FIG. 1.

Illustrated in FIG. 1 is a preferred construction of a clutch control mechanism A embodying the improvements of this invention; the control mechanism is shown as mounted upon a power unit of a typical automobile with which the mechanism cooperates. The power unit comprises an internal combustion engine B controlled by a throttle B–1 and adapted to transmit torque to a conventional synchromesh counter-shaft transmission C through a friction-disc type clutch device D. The transmission C occupies but a fraction of the space normally occupied by a standard automatic hydraulic transmission and is subject to much less maintenance problems. As far as the driver of the automobile is concerned, the illustrated power unit transmits torque in a seemingly automatic fashion similar to a fully automatic transmission, by utilization of the improved clutch control mechanism A which is responsive to engine operation and to a change in the gear position of the transmission to automatically engage and disengage the clutch D.

The mechanism A, being highly economical, compact and of simple construction, generally comprises the following principal elements: a clutch actuating means A–1 for operating the clutch and actuated by engine lubrication oil pumped thereto, a primary control valve A–2 for regulating the oil pressure administered to the servomotor and having a vacuum-operated modulating means A–3 connected to the engine manifold E, an electrically operated dump valve means A–4, and a switch means A–5 actuated by the gear-shift lever F. The control valve and clutch actuating means A–1 may each be conveniently mounted on the engine block or clutch housing or the control valve may be mounted on the engine lubrication pump in place of its pump cover plate; these mountings promote the adaptability of the clutch control mechanism to most any automobile construction.

To maintain the clutch D in the engaged condition for normal drive purposes, lubrication oil is pumped by the engine to the servo-motor A–1 and is maintained at an operative pressure level by control valve A–2 so as to apply sufficient clutch engaging force to meet varying driving needs. Upon a change in gear ratio of the transmission, the switch means A–5 automatically actuates the electrical dump valve A–4 to fully communicate the engine manifold E with the vacuum-operated modulating means A–3 for affecting valve A–1 in a manner to dump lubrication oil pressure to an engine sump chamber (not shown) and thereby disengage the clutch D with relief of pressure in the servo-motor A–1. Declutching takes place so rapidly that no difficulty is experienced even during the fastest gear changing. Reengagement of the clutch takes place as the shift lever completes its gear change stroke, whereupon the dump valve is deenergized.

*Clutch actuating means*

Figures 3, 4, 5, 6:
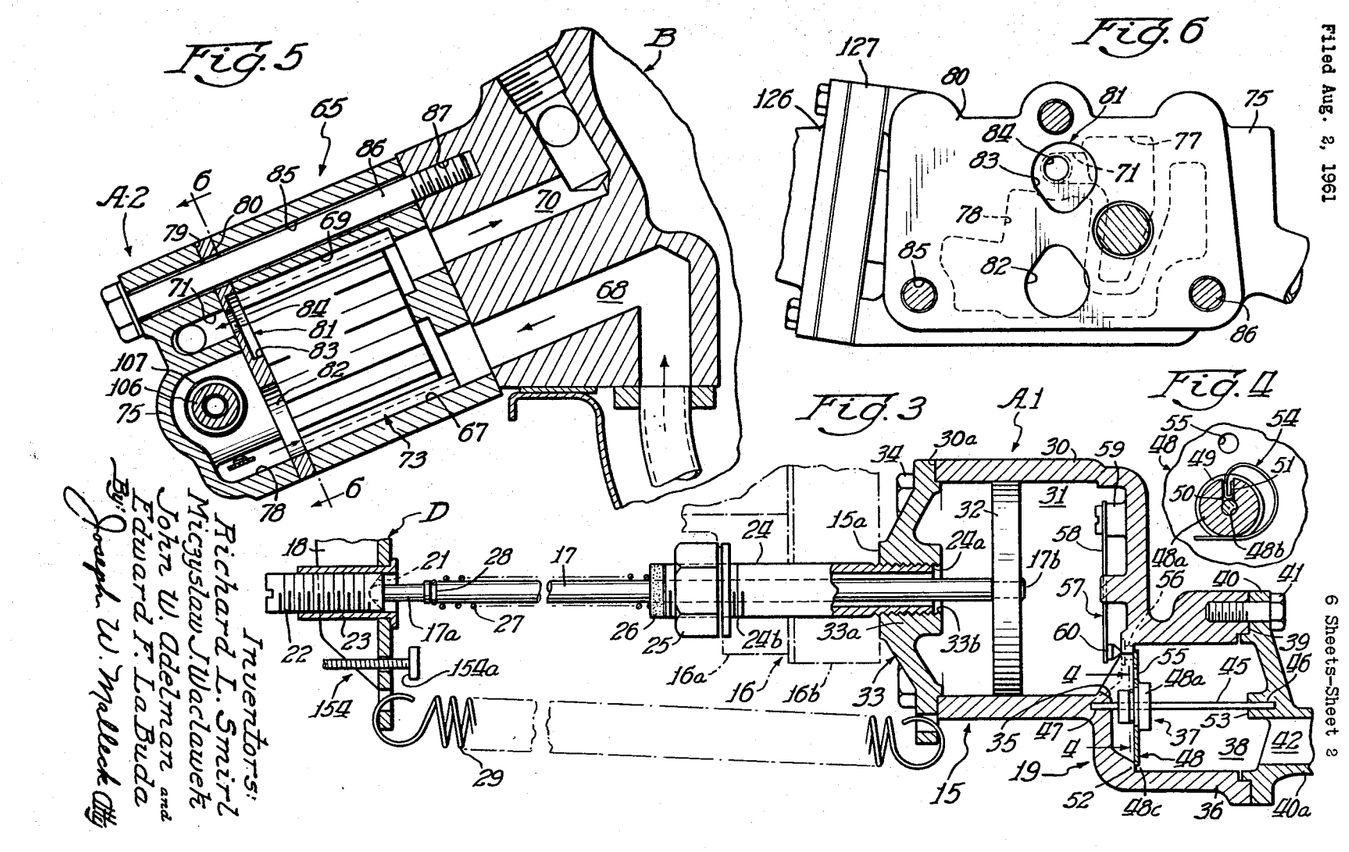
FIG. 3 is an enlarged elevational view of the clutch actuating means for the clutch control mechanism of FIG. 1.
FIG. 4 is a still further enlarged sectional view of a portion of the clutch actuating means of FIG. 3 and illustrating the disc valve member used with the phasing means as part thereof.
FIG. 5 is a sectional view of the primary control valve taken substantially along line 5—5 of FIG. 7 and also illustrating a portion of the engine pumping system cooperating therewith.
FIG. 6 is a sectional view taken substantially along line 6—6 of FIG. 5 and illustrating the inner face of the primary control valve.

Turning now to FIGS. 3 and 4, the clutch actuating means A–1 for the clutch device D is more specifically shown to comprise a fluid-operated actuator or servomotor 15 mounted on the housing 16 of the clutch device and has a thrust-rod 17 operatively connected to a clutch actuating lever 18; the fluid intake of the servo-motor is regulated by a fluid accumulator valve assembly 19 integrally affixed to the servo-motor.

Although not fully shown, the clutch device may be constructed in accordance with a clutch device as shown in U.S. Patent 2,253,344, issued 1941 by Nutt and Cook, which is a spring released and hydraulically engaged clutch; the clutch actuating lever 18 extends through an opening in the clutch housing 16 and is adapted to operatively and axially slide a bearing collar journaled to the clutch input shaft which in turn engages a plurality of operating levers which function to bring the friction members of the clutch device together for conjoint rotation.

Upon deactivation of the servo-motor, a large tension coil spring 29 and assisted by internal springs of the clutch (not shown) returns the lever 18 to a position in which the clutch device is disengaged; the spring 29 is mounted with one end engaging the outer extremity of lever 18 and the other end engaging a portion of the servo-motor structure.

As shown in FIG. 3, the thrust-rod 17 is arranged with one end 17a engaging a concave seat 21 of a thrust-plug 22, the thrust-plug being threadably and adjustably carried in a retaining sleeve 23 mounted on the outer extremity of lever 18. The thrust-rod 17 is slidably disposed in a sleeve member 24 which in turn is mounted in outer pheripheral flanges 16a of the clutch housing 16 and flange 16b of the engine block. The sleeve member 24 acts as a dowel in aligning the clutch housing on the engine block during assemblage. The rod is adapted to articulate therein. The servo-motor 15 is adapted to be threadably mounted on end 24a of the sleeve member and has shoulder 15a abutting the clutch housing 16. The other end 24b of the sleeve member threadably carries a nut means 25 which is adapted to secure the servo-motor and sleeve member to the clutch housing. An annular seal 26 is carried on the thrust-rod for providing an air seal between the sleeve member and the rod; a coiled compression spring 27 is also carried on the thrust-rod and has one end received by an annular groove 28 adjacent the end 17a of the rod and has an opposite end engaging the seal 26, the spring functioning to maintain the seal in proper sealing relationship with the end of the sleeve member.

The construction of the servo-motor A–1 comprises a casing 30 formed with a major internal cylindrical cavity 31 opening to one side of the casing and thereby providing an annular terminal 30a; the major cavity is adapted to receive a cylindrical piston 32 slidably disposed therein and which is attached to the end 17b of the thrust-rod 17 extending thereinto. Terminal 30a of the casing faces and is adjacent the clutch housing 16 and is closed by a casing cover 33 secured thereto by suitable fasteners 34. A central neck portion 33a of the cover is provided with a threaded bore 33b into which the end 24a of the sleeve member is inserted, as above discussed.

A fluid supply opening 35 is formed in the casing at the end of the major cavity 31 opposite the terminal 30a. A cylindrical integral extension 36 of the casing 30 is formed about the supply opening and is adapted to constitute a part of the housing for the accumulator valve assembly 19. The extension 36 is provided with a cylindrical internal minor cavity 38 which is disposed to provide fluid communication between the supply opening 35 and an entrance to the extension 36 defined by an annular terminal 39. The terminal 39 is closed by an extension cover 40 which is secured thereto by suitable fastening means 41 and has a fluid supply passage 42 formed in a lower section thereof. The supply passage, as shown, has a diameter generally commensurate with the diameter of the supply opening 35. A neck portion 40a is formed about the supply passage and is adapted to receive a supply conduit as will be described.

The major and minor cavities, 31 and 38 respectively, have their axes generally parallel but offset one from the other so that the fluid passes into a corner of the cavity 31 from cavity 38. Although this is for purposes of a preferred embodiment it should be indicated that the phasing means 19 may be disposed anywhere in the fluid connection between the servo-motor and fluid pressure control. By virtue of the phasing means sub-assembly 37, as will now be described, fluid is supplied to the servo-motor so that it may apply a quick initial engaging force with gradually controlled stages of increase in force thereafter.

The sub-assembly 37 comprises a pin shaft 45 having one end journaled in a bearing 46 provided in the extension cover 40 and an opposite end journaled in a bearing 47 provided in the casing 30 adjacent supply opening 35. The pin shaft is generally horizontally disposed and carries a sliding or floating disc valve member 48. The disc valve member has a hub portion 48a provided with a central bore 48b (FIG. 4) which is slidably engaged with the pin shaft. The hub portion has at least one section which extends axially to one side of the disc valve member and has provided on its outer periphery an annular groove 49 (FIG. 4); a slot 50 is formed in the hub portion to communicate the groove 49 and the bore 48b. A spring clip 54, here formed of wire, is mounted on the axially extending section and within the groove 49 and has a nose 51 which is adapted to extend through slot 50 to frictionally engage the pin shaft 45. The spring clip 54 is calibrated to provide a sufficient amount of spring pressure and resulting frictional force to hold the floating disc valve member in any position on the pin shaft to which it is positively moved by the fluid pressure and prevent inadvertent movement.

The disc valve member is adapted to be moved along the pin shaft between two extreme positions by influence of fluid pressure applied to either side thereof. One of the poistions is assumed when the valve member has its outer annular margin 48c in engagement with an annular protuberance 52 formed in casing 30 at one end of the minor cavity 38. The other position is assumed when the disc valve member has hub portion 48a engaging a central shoulder 53 formed about the bearing 46 on the extension cover 40. It should be noted that in either of these extreme positions, there is defined a chamber between the disc valve member and the most adjacent portion of the accumulator housing in which fluid pressure may act on opposite sides of the disc valve at all times.

The valve member, as shown, has a circular periphery which is dimensioned to be spaced slightly radially inwardly from the walls defining minor cavity 38. Therefore, in the first position as above defined, the disc valve member closes off fluid flow around the disc valve member by virtue of its complete annular contact with the protuberance 52; in the second position, the disc valve member permits fluid flow between its periphery and the housing.

To enable the disc valve member to have a phasing function, it is provided with one or more small ports 55 formed on a portion thereof radially offset from its axis. It can be readily appreciated from the drawings and by virtue of the port 55, that in filling the servo-motor major cavity 31, the floating disc valve member 38 permits fluid to rush in quickly at first until the disc valve member seats against the annular protuberance 52. Further application of fluid pressure to the phasing means assembly causes further buildup of pressure in the servo-motor cavity 31 to be gradual as determined by the size of the port 55. It is important that the volume of minor cavity 38 and the diametrical dimension of port 55 be constructed to give smooth clutch engagement under all operating conditions. For purposes of the preferred embodiment, the volume of the minor cavity 38 has been calibrated to generally equal the displacement volume of the servo-motor A–1 providing for initial filling of the servo-motor to take place swiftly before the floating disc valve member seats against the annular protuberance 52. Clutch engagement will thereby be much smoother since further application of pressure is modulated by operation of the port 55.

To enable the phasing means 19 to function properly in spite of varying extremes of temperature of the fluid used therein, fluid communication between cavity 31 and 38 is assisited by an opening 56 provided in the casing 30. Opening 56 may be located partially or completely radially outwardly of the outer periphery of accumulator valve member 48. This opening is operably controlled by a temperature responsive valve means 57 comprising a bi-metal strip 58 arranged within cavity 31 and secured at one end to a boss 59 formed at the base of the cavity. The other end of the bi-metal strip carries a restricting element 60 which is adapted to close off opening 56 when brought thereagainst. Thus, when the oil lubricating temperature is low, its viscosity is correspondingly very high and therefore the temperature responsive valve means 57 will remain in position to keep opening 56 unrestricted. When the oil becomes hot, after the engine has been operating for some time, the phasing means moves into position for closing off opening 35.

The opening 56, as controlled by the temperature responsive valve means 57, cooperates with the accumulator valve to provide a three-stage admission of fluid to the servo-motor. The first being the swift injection of fluid therein as the disc valve moves along the pin shaft. The second being a reduced flow as fluid passes only through port 55 and opening 56; the onflow of oil tends to spring the strip 58 back since it has a light spring effect. As the pressure in the servo-motor tends to equal the incoming pressure, the bi-metal strip 58 will close off opening 56 and flow is further reduced so as to pass only through port 55.

To complete the clutch actuating means, reference is now made to FIG. 5, in which is shown one portion of a fluid supply and pumping means 65, which is adapted to deliver lubricating oil through the primary control valve means A–2 and through conduit 66 (FIG. 1) to the passage 42 of the phasing means assembly 19. More particularly, the fluid supply and pumping means 65 comprises a pump 73 of any suitable construction and arranged for drawing fluid such as lubricating oil from an oil reservoir or sump (not shown) by means of an inlet passage 68 leading to chamber 67 of the pump, and for delivering pressurized oil to an outlet chamber 69 in the pump. The outlet chamber is connected at one side to an engine lubrication conduit 70 and at the other side to an inlet chamber 71 in the primary control valve A–2. Conduit 70 and inlet passage 68 may be suitable formed by borings within the engine block adapted for alignment with the inlet and outlet of the pump 73; the pump may be driven by the crankshaft of the engine B in any suitable manner (not shown).

It should be indicated that the only passage subject to the time delay associated with the flow of viscous fluid in the control system is the conduit 66 which is actually made quite short (FIG. 1) by locating the primary control valve means A–2 close to or integral with the servo-motor A–1, all of the other passages between control members handle only a small displacement of fluid which results in almost instantaneous response.

*Primary control valve means*

Referring now to FIGS. 5–8, there is more particularly shown the primary control valve means A–2 which is adapted to regulate the pressure of the oil flowing between the pump 65 and the servo-motor A–1, the oil pressure being used to hydraulically engage and disengage the clutch D in response to manual selection and, furthermore, to vary the clutch engaging force in sympathy with the varying conditions of the engine.

Figures 7, 8, 9:
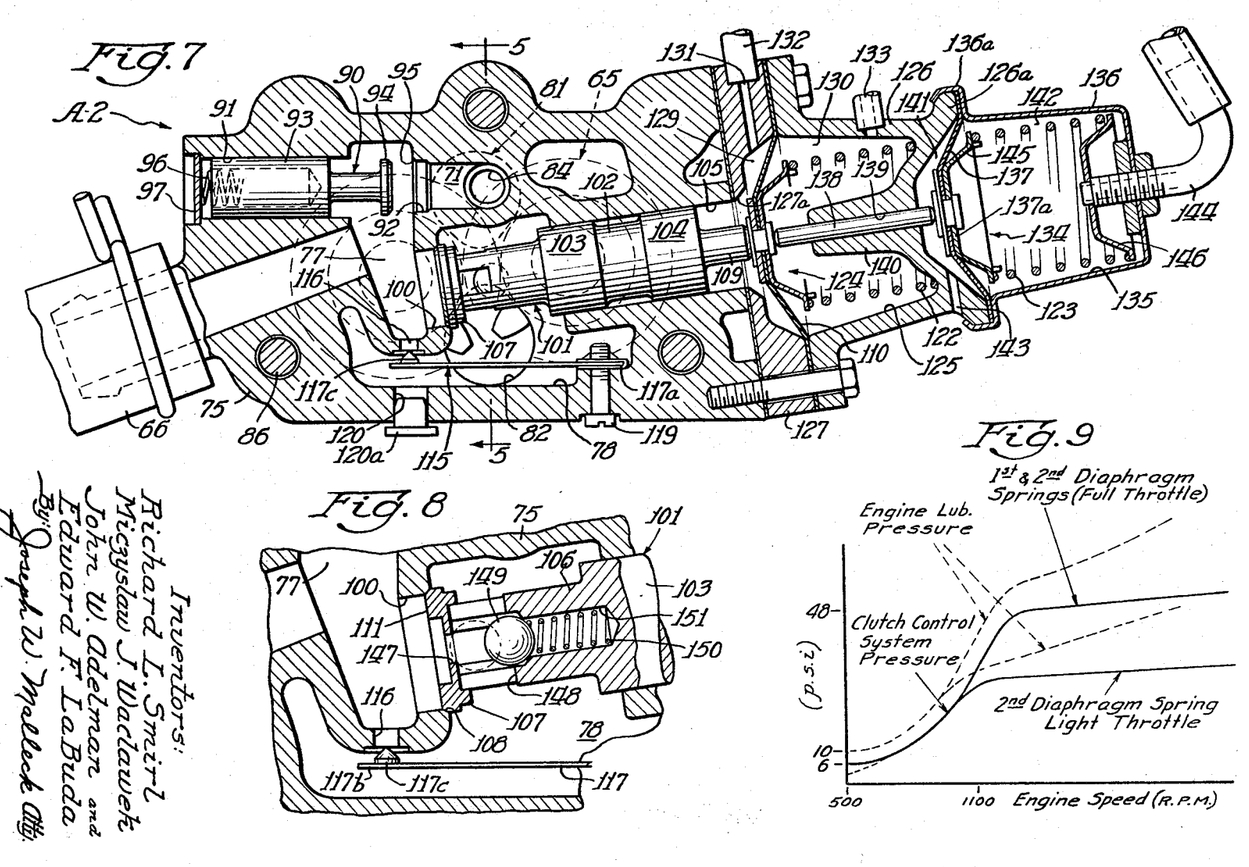
FIG. 7 is an enlarged elevational view, substantially in cross-section, of the primary control valve and vacuum-operated modulating means for the clutch control mechanism.
FIG. 8 is a still further enlarged fragmentary sectional view of a portion of the control valve of FIG. 7, illustrating primarily the by-pass port and speed responsive pressure control orifice with operative valving members.
FIG. 9 is a graphical representation of the fluid pressure supplied to the servo-motor as a function of engine speed plotted for along the abscissa.

The control valve means comprises a housing 75 formed of cast material, such as aluminum, and has provided therein three major and irregularly shaped chambers; inlet chamber 71, control or sensing chamber 77, and exhaust chamber 78. One side 79 (FIG. 5) of the housing is formed substantially flat and is adapted to be mounted facing the pump; each of the indicated chambers are formed in the housing so that they may open outwardly upon the flat side 79 and have an outcrop configuration within the plane of the flat side which is generally commensurate to the greatest dimensions of such chambers. This facilitates repair and easy access to the chambers. As shown in FIGS. 5 and 7, the housing is highly compact, having a thickness in the direction toward the engine which is equal to or less than one-half the length or height of the housing.

A flat housing plate 80, having a generally rectangular outer periphery similar in shape to the periphery of the flat side 79 of the housing, is adapted to be sandwiched between the flat side of the housing and the pump 73 during assemblage, as shown in FIG. 5. A pair of apertures 81 and 82 are formed in plate 80; aperture 81 is adapted to communicate the upper chamber 69 of the pump with the inlet chamber 71 of the housing 75. Aperture 81 has a stepped configuration including a pear-shaped large bore 83 adjacent chamber 69 and a smaller bore 84 adjacent chamber 71. As will be described subsequently, the smaller bore 84 functions as a restriction to control the supply of fluid to the clutch engaging system and at closed throttle position, clutch engagement is made somewhat softer. The bore 84 also functions to provide further increases in engine lubrication pressure with higher speeds in spite of the attainment of maximum pressure in the clutch system; this insures that the engine lubricating pressure will always be greater than the pressure in the clutch system (see FIG. 9). Aperture 82 is generally pear-shaped and is adapted to communicate chamber 67 of the pump and the exhaust chamber 78 of the housing. Aperture 82 is sufficiently large so as not to affect the flow of the system.

A plurality of aligned openings 85 are provided in and through the housing 75, plate 80, and pump 73; each opening receives the shank of a mounting cap screw 86. The inner ends of each of the cap screws is adapted to be threadably received in a threaded bore 87 formed within the block of the engine.

To insure that the engine B will be supplied with sufficient lubricating oil before any oil is diverted to the servo-motor A–1, a pre-load or poppet valve 90 is slidably disposed within a cylindrical cavity 91 formed in the housing and communicating the exterior thereof with the control chamber 77. A regulator opening 92 is formed in the housing communicating with the inlet chamber 71 and the control chamber; the opening 92 is generally aligned with the cavity 91. The pre-load valve 90 has a hollow cylindrical section 93 which slidably engages the walls of the cavity 91 and carries a valve head 94 extending axially therefrom and adapted to close off the opening 92 when seated against an annular valve seat 95 about the opening. The pre-load valve is normally urged into the closed position of opening 92 by a coiled compression spring 96 contained within the hollow interior of section 93 and acts between the preload valve and a cap 97 covering the exterior of cavity 91. The spring is adapted to provide a light load and allow the preload valve to open when a pre-determined relatively low pressure has been achieved in the inlet chamber 71. For purposes of the preferred embodiment, it is preferable to calibrate spring 96 to prevent oil from flowing into the control chamber 77 until generally 10 p.s.i. of pressure has been developed.

For effecting engagement of the clutch device and for regulating the pressure build-up in the control chamber 77, the housing 75 has formed therein a by-pass or discharge port 100 which has a generally large diameter so that the dimension of the port will not provide a restriction to flow through the system when fully open. The by-pass port communicates between control chamber 77 and exhaust chamber 78. A control valve assembly 101 is associated with the port 100 and comprises a valve member or element 102 having a pair of spaced lands 103 and 104 which are slidably disposed within a cylindrical cavity 105 formed in the housing and communicating the exterior of the housing with the exhaust chamber 78. One end of the valve member 102 has formed thereon a neck portion 106 which carries a valve head 107 adapted to seat against an annular valve seat 108 formed about the port 100; the port is adapted to be closed off when the valve member is in the position as shown in FIG. 7. The opposite end of the valve member has an extension 109, engaging diaphragm 110 which in turn is spring loaded to urge the valve member to the closed port position. The valve member is arranged so that the inner face 111 of the valve head is subjected to the pressure of the control chamber 77, wherefor the control valve assembly is caused to act as a pressure relief valve for the pump to prevent the build-up of excessive pressure in the engine lubrication system and in the clutch control system.

To simplify the establishment of clutch engaging pressure differing from that due solely to engine speed for certain of the high speed driving ratios and to eliminate requirements for rotating weights or valves, a by-pass speed responsive pressure control orifice construction is provided in the valve member 102 which is adapted to return the discharge of the engine driven pump back to the pump in a predetermined flow manner. To this end, a thin plate orifice 147 is centrally provided in the valve head 107 and communicates with diametrically extending bore 148 opening into exhaust chamber 78. The bore is made sufficiently large so that it will offer relatively no restriction to flow compared to the by-pass orifice, the orifice will modulate the pressure increase in the control chamber in a manner such that the increase in engagement pressure transmitted to the servo-motor will vary approximately in proportion to the square of the engine speed so that the effect is almost identical in clutch engagement with an arrangement of a centrifugal clutch for controlling clutch engagement pressure.

At engine idle, when the transmission is in gear, it is very desirable to have the clutch device slightly dragging in order to utilize the engine as a braking means during hill coasting and to take up the phenomenon of drive line back-lash when fully engaging the clutch and thereby avoid initial thump. To initiate such slight drag on the clutch, the pressure in the control chamber must be maintained slightly higher than necessary to overcome the force of the retractor spring and the springs within the clutch device itself. This requires some means for augmenting the pressure in the control chamber, assuming that the orifice size is predetermined to give a reasonable full throttle stall speed and the retractor spring is calibrated to give a sufficient and quick release upon dissipation of pressure in the control chamber. To meet such requirement, the by-pass orifice is adapted to be closed by a pre-loaded valve 149 in the form of a ball and is urged toward closing position by a coil spring 150 acting between one end of the bore 151 provided in the valve member 102 and one side of the ball pre-load valve. Such spring acts upon the pre-load ball valve to set a low limit on the pressure within the control chamber when the valve member closes off the release port 100.

It is desirable, however, to limit the initial idling engagement to about 6 ft.-lb. of torque (or 6–8 p.s.i.) to avoid appreciable creep after the vehicle is stopped in low gear and to avoid engine "throb" when standing in gear.

Thermostatically controlled means 115 is provided within the housing 75 for controlling a limited flow of fluid from the control chamber 77 to the exhaust chamber 78 and thereby to the inlet side of the pump. Herein such means comprises an opening 116 communicating chambers 77 and 78 and a thermostatic valve member 117 which is mounted in chamber 78 and adapted to close off opening 116. Member 117 comprises a bi-metallic strip having one end 117a secured to the inner wall of chamber 78 by a suitable fastener 119 and an opposite end 117b which carries a conically shaped plug 117c arranged to restrict the opening upon movement or flexing of strip 117 in response to changes in temperature of the oil. The construction and arrangement of the thermostatic valve means 115 is such that the fluid pressure drop across the by-pass port will be the same regardless of changes in the viscosity of the lubricating oil by changes in its temperature for any given pressure in the chamber 77. A change in temperature of the lubricating oil will cause the bi-metallic strip to change its shape and thereby to move the plug 119 to or from the opening 116. Thus, the pressure drop across the by-pass port is substantially unaffected by changes in oil temperature so that there will be no alteration in the control characteristics between the period of starting with a cold engine and operation after the engine has warmed up.

A drain opening 120 is provided in housing 75 and is normally closed by stopper 120a; such drain opening facilitates removing all fluid from the chamber 78 as desired.

Referring again in particular to FIG. 7, an actuating mechanism is shown for purposes of operatively moving the valve member 102. The actuating mechanism is principally comprised of a plurality of coil springs 122 and 123 which are adapted to urge the valve member to a closed position. To over-ride one or more of these springs, a vacuum operated modulating means is incorporated as part of the mechanism. In reference first to the apparatus cooperating with the spring 122, there is a diaphragm assembly 124 disposed in a chamber 125; the chamber 125 is formed by a cup member 126 and a coupling plate 127 having a central opening 127a and which is sandwiched between the cup member and the control valve housing 75. Between the cup member and the coupling plate 127 is clamped the outer margin of the flexible diaphragm 110 which has its central portion connected to the neck 109 of the valve member 102. The diaphragm 110 divides the chamber 125 into a first chamber portion 129 and a second chamber portion 130. The first chamber portion 129 communicates with the atmosphere by means of a passage 131 in connection with a conduite 132 leading to the valve cover of the engine in order to dispose of oil vapor formed in the first chamber portion. The second chamber portion 130 is arranged for selective communication with the engine manifold E by means of a duct 133.

The spring 122 is disposed within the second chamber portion 130 and is adapted to axially urge the central portion of the diaphragm 110 and therefore the valve member 102 toward the closed port position.

A second diaphragm assembly 134 is provided and comprises a second chamber 135 formed between a cup element 136 and the exterior of the cup member 126. The cup element 136 has a lip portion 136a which is secured to an annular flange 126a of the cup member. In similar fashion to the first assembly, a second flexible diaphragm 137 has its outer annular margin clamped between the cup member and the cup element and has a central portion 137a employing a rod 138 which is slidably disposed within a bore 139 formed within a neck 140 of the cup member. The rod has a touching engagement with the first diaphragm and in effect provides a lost motion connection between the diaphragms. Spring 123 acts between a pair of brackets 145 and 146, respectively secured to the end of the cup element and the diaphragm, to augment the first spring and urge the valve member 102 into closing position when permitted by pressure on the diaphragm 137.

The chamber 135 is in general axial alignment with the first chamber 125; the diaphragm 137 divides the chamber into a first chamber portion 141 and a second chamber portion 142. The first chamber portion 141 communicates with the atmosphere through a passage 143, and the second chamber portion 142 communicates with the intake manifold E of the engine by means of a duct 144.

The construction and arrangement of the actuating mechanism is such that vacuum in the chamber portions 142 and 130 will tend to urge the respective diaphragm assemblies in a direction against the action of the compression springs 122 and 123 which normally provides a closing force acting on the valve member 102.

*Dump valve means*

The vacuum or pressure from the engine manifold E (FIG. 1) is selectively supplied to the chamber portion 130 of the first diaphragm assembly 124 by operation of the dump valve means A–4 (see FIGS. 10 and 11) which is adapted to open and close the duct 133 leading thereto; the duct, however, will always be connected to manifold vacuum or atmospheric pressure. The means A–4 comprises an air valve body 155 having an inlet passage 156 and an outlet passage 157. The body is placed in the duct 133 so that its passages form a part thereof. At an intermediate portion of the body, where the passages tend to meet, each passage is provided with a turned neck portion, designated 156a and 157a respectively, adapted to be arranged in parallel and communicate with a cavity 158 provided at one side of the valve body. The cavity 158 opens outwardly upon the exterior of the valve body and forms an annular terminal 159 thereof.

Figure 10:
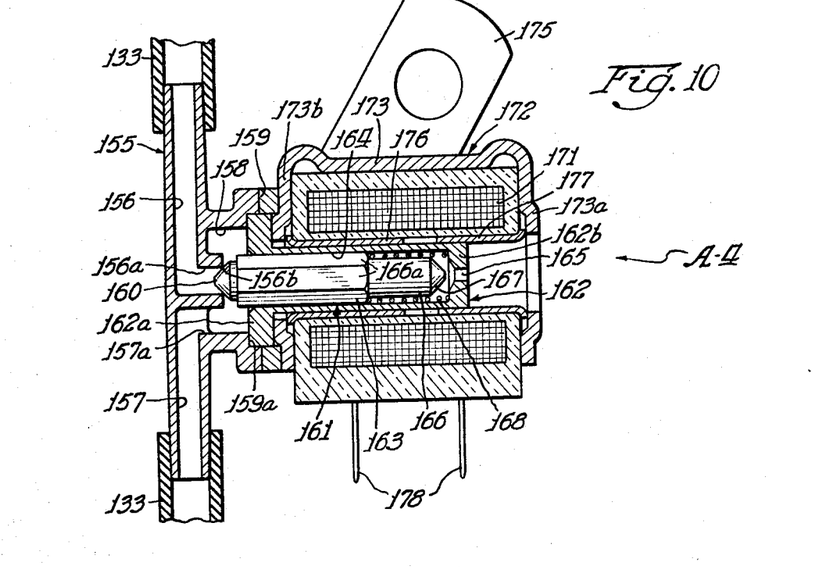
FIG. 10 is an enlarged sectional view of an electrical solenoid dump valve used to control flow to a portion of the vacuum-operated modulating means of FIG. 7.
Figure 11:
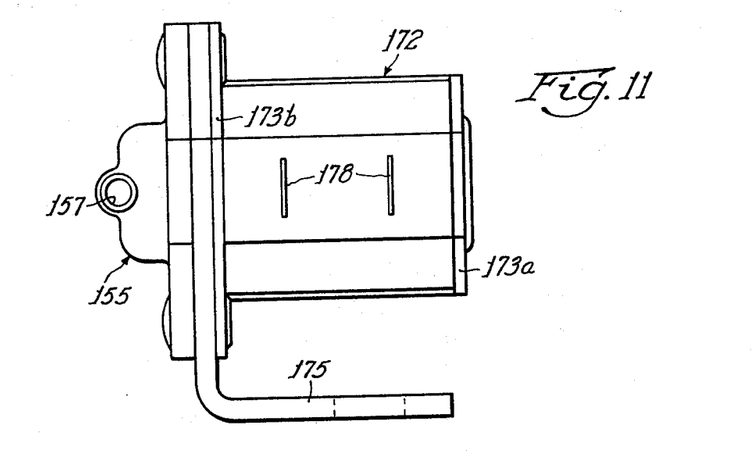
FIG. 11 is a view taken substantially along line 11—11 of FIG. 10.

To alternatively communicate passages 156 and 157 via cavity 158 or to connect passage 157 solely with atmospheric pressure, an electrically actuatable armature 161 is slidably mounted within a sleeve 162 closed at one end and having an annular flange 162a connected to an annular recess 159a formed on the terminal 159 of the body; the sleeve closes off cavity 158. The armature is generally aligned with the neck portion 156a and carries a valve element 160 having a truncated conical nose for closing off the mouth 156b of the neck portion constituting a valve seat.

More particularly, the armature 161 has a major cylindrical section 163 provided with a generally hexagonal cross-sectional shape; the major section is adapted to have the edges of the six sides 163a in sliding engagement with the inner circular cylindrical surface 164 of the sleeve for providing a plurality of axially extending air passages between the armature and sleeve. The closed end of the sleeve 162b has formed therein a central port 165 which is generally conically shaped at its inner extent. A cylindrical extension 166 of the armature extends axially outwardly from the end of the section 163 opposite the valve element and is adapted to close off the port 165 by a valve head 167 adapted to mate with the inner conical surface of the port 165.

The armature is normally urged into a first position by a compression spring 168 acting between the end 162b of the sleeve and the section 163 so that valve element 160 closes off the mouth of the neck 156a and open port 165. In such position, atmospheric pressure is vented to the first diaphragm assembly through port 165, past the hexagonal sides of section 163 and through outlet passage 157. To open the mouth of neck 156a against the spring and vent vacuum to the diaphragm assembly, a solenoid construction is provided in conjunction with the armature. The solenoid comprises a coil pack 171 disposed about the sleeve and has suitable internal wiring which when energized slidably actuates the armature to the right as seen in FIG 10. The coil pack 171 is mounted on a bracket 172 having an axially extending central portion 173 with extensions 173a and 173b at opposite ends thereof extending radially inwardly to engage the sides of the coil pack; a bracket arm 175 is adapted to secure the mounting bracket to a fixed member, such as the engine block. The coil pack is separated from the sleeve by a pair of axially aligned sleeve segments, designated upper sleeve segment 176 and lower sleeve 177. Suitable electrical terminals 178 are provided on the coil pack for connection to the switch means A–5.

Switch means

Figures 12, 13, 14:
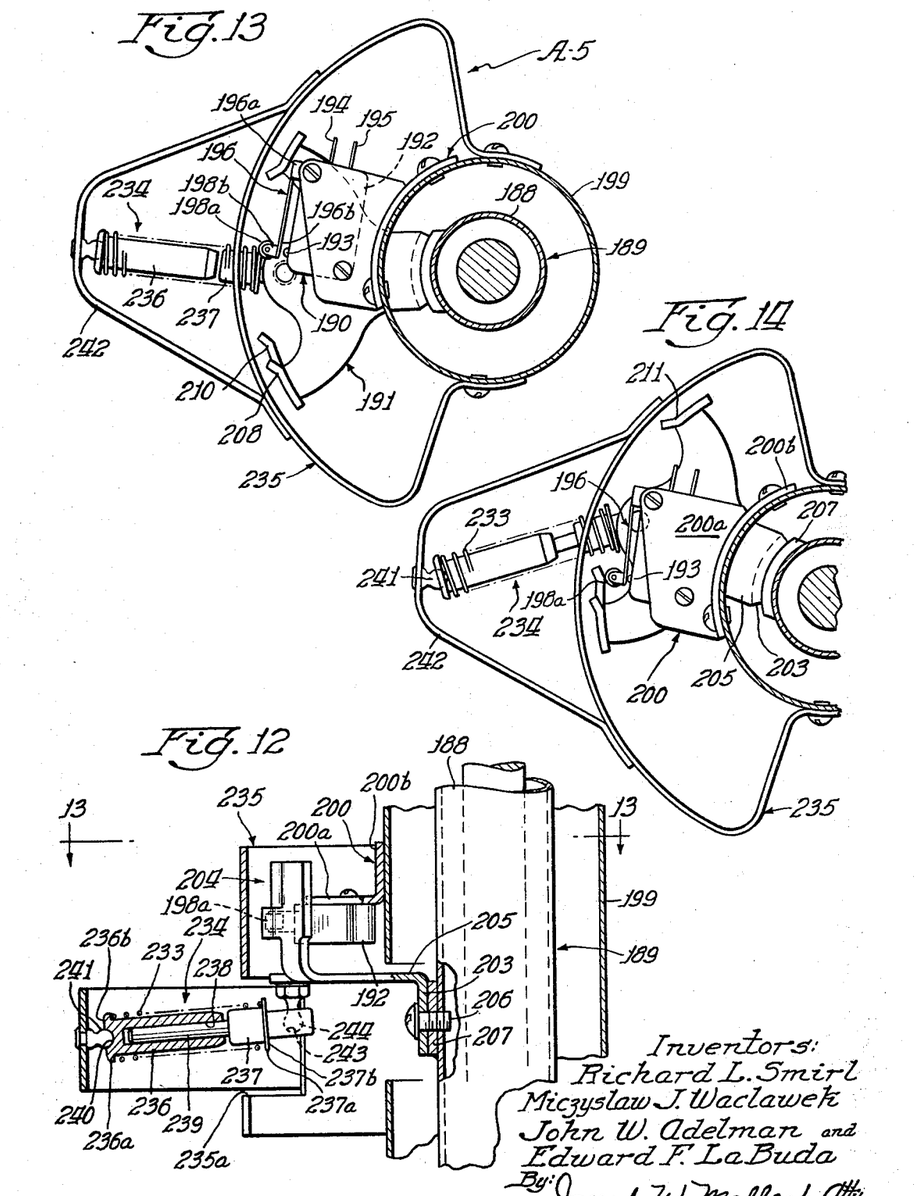
FIG. 12 is an enlarged fragmentary sectional view of a portion of the steering and gear-shifting mechanism and illustrating the switch means cooperating with the mechanism for use with the clutch control mechanism of FIG. 1.
FIG. 13 is a sectional view taken substantially along the line 13—13 of FIG. 12 and illustrating one operative position of the switch means and gear shift mechanism.
FIG. 14 is a view like that in FIG. 13 illustrating another operative position of the electrical switch means and gear shift mechanism.

Turning now to FIGS. 12–18, there is illustrated in more particularity the switch means A–5 as adapted to respond to a specially constructed driver-operated gear shifting mechanism for actuating the electrical dump valve A–4, as previously described. The switch means, in its broader aspects, comprises a micro-switch 190 which is fixedly mounted on a suitable member of the auto and is actuated by a specially constructed cam 191 connected to a shift mechanism 189 disposed within a conventional steering column construction; the cam is connected thereto so that it will move in response to movement of a shift tube 188 actuated while changing gear positions. As shown in FIGS. 12–14, the switch 190 comprises a switch box 192 having a contact 193 disposed at one corner of the box and protruding outwardly from the side thereof; another side of the switch box has a pair of electrical terminals 194 and 195. In FIGURE 13, the micro-switch is in the normally closed position having an electrical circuit complete between the terminals. A switch member 196 is mounted on the same side of the switch box as the contact 193 and is adapted to open the switch upon being actuated. The switch member is formed as a flexible blade element having one end 196a pivotally mounted on a portion of the switch box in a manner so that the other end 196b is held slightly spaced but adjacent to the switch contact when the blade element is in unflexed condition. The end 196b carries a cam follower 198 comprising a roller 198a and a roller mounting 198b attached to the end 196b; the cam follower extends outwardly from the side of the element 196 opposite to the switch box. Thus, upon bringing the cam 191 against the roller 198a, the blade element is caused to flex and bend downwardly as shown in FIG. 14 toward contact 193; such flexure will be generally in a radial direction of the shift tube and open the switch.

The switch 190 is fixedly mounted upon a jacket tube 199 (the jacket tube constitutes the outer casing of the steering column construction) by a bracket 200, FIG. 12, which is generally L shaped. One leg, 200a, of the bracket is fastened to one side of the switch box 192 and the foot 200b thereof is generally arcuately shaped and is secured by suitable fasteners 201 to the outer periphery of the jacket tube.

Figures 16, 17:
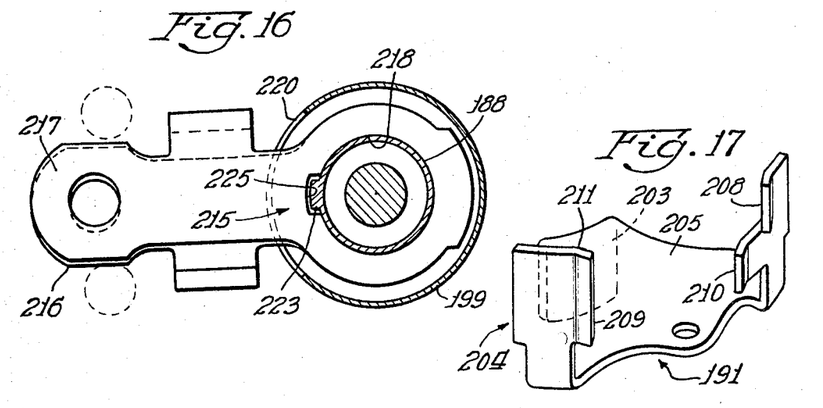
FIG. 16 is a sectional view taken substantially along line 16—16 of FIG. 15.
FIG. 17 is a perspective view of the cam-plate used with the switch means.

The cam 191 has two generally arcuate offset portions 203 and 204 with the portions being interconnected by a web 205 extending generally radially of the shift tube. The offset portion 203 provides a mounting foot which is adapted to be secured to the shift tube by suitable fasteners 206. (As shown in FIG. 12, a mounting block 207 is welded to the shift tube to provide a thicker base in which to insert the fasteners 206). The other arcuate offset portion 204 constitutes a cam plate which overhangs the switch 190 and is formed so that certain segments thereof will engage the cam follower upon movement of the shift tube. The camming segments are here four in number corresponding to the number of gear position and day be designated as 208 for the first gear position, 209 for the second gear position, 210 for the high gear position, and 211 for the reverse gear position; they are adapted to depress the cam follower upon being brought into contact therewith in response to shifting motion of the shift tube actuated by a conventional shift lever. The camming segments are both circumferentially and axially spaced apart in reference to the axis and circumference of the jacket tube.

While the engine B is delivering driving torque through the transmission C, it would be difficult to shift between gear positions if some provision were not made to disengage the clutch. Therefore, the switch means is adapted to operate in response to the shift lever and before the transmission is actualy shifted during a change in gear operation: this is provided by a unique type of lost motion connection, generally designated 215 which not only achieves the desired proper timing of clutch disengagement and transmission gear change, but also obviates other deficiencies in conventional shift tube connections.

Figures 15, 18:
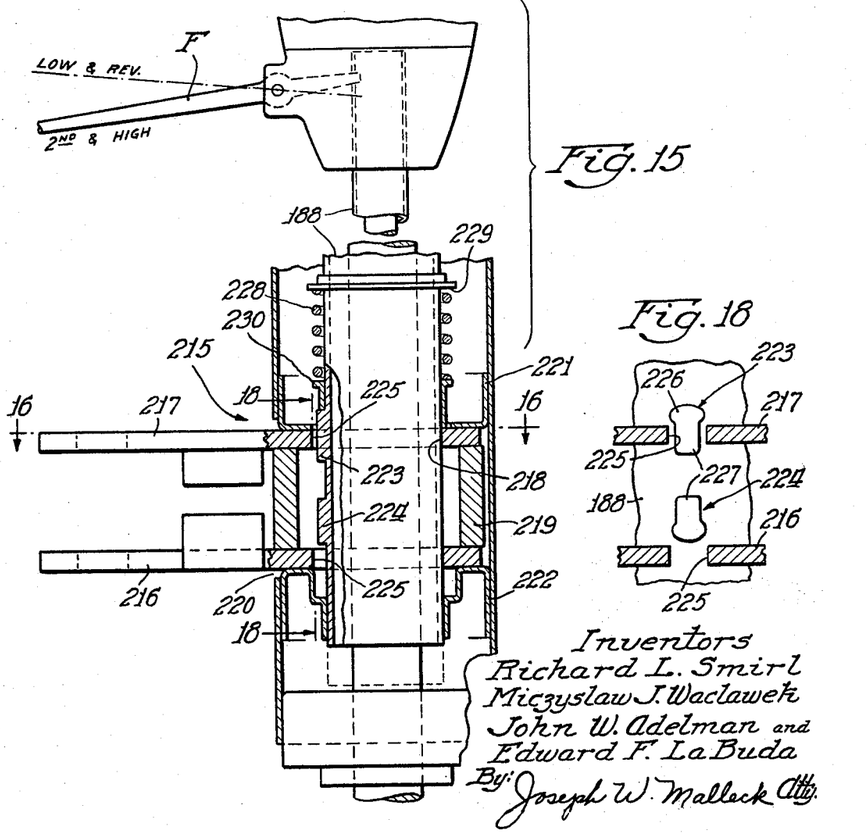
FIG. 15 is an enlarged fragmentary sectional view of the steering column and gear-shift tube and illustrates that portion thereof wherein the shift tube is operatively connected with shift linkage leading to the transmission; the gear shift lever is also shown schematically connected with the shift tube and has its extreme operative positions shown in outline.
FIG. 18 is a fragmentary sectional view taken substantially along line 18—18 of FIG. 15.

Turning now to FIGS. 15, 16 and 18, the shift tube 188 is adapted to be rotatably engaged with a pair of control arms 216 and 217 which extend through an opening 220 provided in the jacket tube, and are in turn suitably connected by linkage (FIG. 1) to the transmission in a manner well-known to the art. Each control arm has one end which forms an annulus about the shift tube with a generally circular opening 218 through which the shift tube extends. The opposite end of each control arm is adapted for connection to the aforementioned linkage. The control arms extend radially outwardly from the shift tube and are spaced apart by a cylindrical spacer 219; upper and lower bushings 221 and 222 are provided on opposite sides of the control arms to maintain their proper position, each bushing having an outer flange engaging the inner side of the jacket tube and an inner flange which engage the outer surface of the shift tube.

To enable either one of the control arms to be selectively rotated by the shift tube, a pair of axially spaced keys 223 and 224 are formed on the outer surface of the shift tube. The keys are adapted to be axially moved into position within one of the index slots 225 provided on the inner periphery of the opening 218 in each control arm. The spacing between the keys is arrange so that when the shift tube is in its uppermost position as controlled by the shift lever, one of the keys will be aligned with the index slot 225 of the control arm 217 and the other key will be out of alignment with the slot 225 of the control arm 216 and intermediate the arms. Similarly, when the shift tube is moved to its lowermost position as controlled by the shift lever, the keys will reverse their position relative to the arms, having one aligned and the other out of alignment with the slots.

To enable the clutch to be disengaged during the shifting operation before the transmission gears are actually shifted, a unique lost motion construction is provided by shaping the keys 223 and 224 in a special manner. As shown in FIG. 18, each of the keys are generally pear-shaped with a wide portion 226 and a narrow portion 227, all of the portions of both keys being generally aligned axially of the tube. In effect, these differential portions provide two different amounts of lost motion in the connection between the control arms and the shift tube.

In the conventional constructions, the keys have always been of a uniform width and dimensioned so that there would be a specific amount of lost motion between the sides of the key and the sides of the index slot. If the lost-motion distance was adapted to give free movement of the shift tube before shifting takes place in transmission, as required herein, there would be a considerable amount of "shaft whip" in the cross-over movement when shifting from one control arm to another.

In the instant invention, the larger portion of each key is adapted to provide the usual play or lost-motion between the slots and keys as in conventional constructions. Therefore, during the cross-over movement, when one key is partially coming into alignment with one index slot and other key is partially withdrawing from alignment (this is an overlapping condition), "shaft whip" will be obviated. But also to provide the greater lost-motion movement for timing disengagement of the clutch with shifting of the transmission, the small portion of each key when aligned with an index slot will be the only contact therebetween and will permit the shift tube to turn considerably before a control arm is actuated.

The shift tube is normally biased upwardly toward the shift lever by a coiled compression spring 228 mounted about the tube; in the position shown in FIG. 15, the tube is in a position where the spring is not overcome and is adapted for moving the arm 217 to achieve second and high gears. The spring has one end bearing against an annular flange 229 secured to the shift tube and spaced axially from the keys; the opposite end of the spring engages an annular lip 230 formed as part of the inner bushing 221 and extends radially outwardly therefrom. The gearshift lever may be moved to shift the tube to the axial position shown in broken outline in FIG. 15 and against the direction of the spring force; arm 216 may then be operated for first and reverse gear positions.

Returning again to FIGS. 12–14, there is shown an arcuately shaped housing 235 which is attached to the jacket tube 199 and provides a protective covering for the switch means 190. The housing has a cut-out portion 235a through which extends an overcentering spring mechanism 234 adapted to retain the cam and shift tube in the position to which it is positively rotated by the gearshift lever F. The mechanism comprises a pair of cylindrical members 236 and 237 which are normally urged apart by a coil compression spring 233 acting between annular flanges 236a and 237a respectively, formed on outer ends 236b and 237b respectively of each member. Member 236 has a cylindrical female socket 238 which receives a mating male element 239 on the member 237.

The member 236 has a spherical pocket 240 on end 236b which receives a ball element 241 secured to a housing extension 242 extending outwardly from the housing 235. The end 236b in effect is fixed to the housing extension except for universal joint swiveling. The member 237 similarly has a spherical socket 243 formed on its end 237b and receives a ball element 244 attached to the web 205 of the bracket 202 carrying the camming segments.

The end 237b is secured to the cam 191 at a point radially outwardly of the shift tube and generally midway between the camming surfaces so that the overcentering mechanism will urge the cam toward such extreme positions. The mechanism acts on the cam in any gear position to eliminate all lost-motion in the direction of engaging transmission gears. Thus, when shifting out of any gear position, the gear shift lever and shift tube rotate throughout the entire lost-motion travel before the keys engage the index slots for making the linkage solid and moving the transmission gears. The micro-switch actuating point occurs within a reasonable tolerance at a point approximately half-way through the total allowable lost-motion travel.

In addition, the mechanism acts on the shift tube through the cam to hold the gear shift lever stationary in each gear position. Therefore, in order to move the cam and actuate the micro-switch, sufficient manual force must be exerted on the gear-shift lever to overcome the force of the overcenter spring load. The mechanism acts to prevent unintentional gear shift lever motion and accidental actuation of the micro-switch when driving over bumpy roads.

As shown in FIG. 1, both the micro-switch and dump valve are incorporated in the ignition system 180 of the vehicle; the system generally comprises an electrical power source 181, an ignition switch 182, a starter relay coil 183, and a starter device 184. The dump valve is arranged in parallel with the starter relay coil and the micro-switch is placed in the ground circuit for the ignition system. Thus, the micro-switch acts as a neutral starting switch during the motion starting period of the system.

As shown in FIG. 2, the ignition system is provided with a separate neutral starting switch 185 and the micro-switch 190 is placed in series only with the circuit leading to the dump valve.

Manual lockout means are provided in order to allow manual engagement of the clutch device when desired. Such means is in the form of a lock-out button 152 which may be placed on the vehicle dashboard or in any other position accessible to the driver. The button 152 is connected by a cable 153 and other linkage (not shown) to a catch mechanism 154 which extends through an opening in the lever 18 of the clutch device and a shoulder 154a adapted to engage the lever upon movement of the lock-out button into operative position.

*Operation*

The operation of the clutch control mechanism may be seen by following through a typical example. Assuming that the engine B is started and warmed up to normal operating temperature and idling speed, the engine driven pump and supply means 65 will deliver fluid from passage 68, to pump chamber 69, and then into the inlet chamber 71 of the primary clutch control housing 75. Further, assume that the throttle of the engine is relatively closed. When the oil pressure in passage 70, chamber 69, and chamber 71 of the clutch control housing have reached the pre-determined required operating pressure for the other controls of the vehicle and is sufficient to lubricate the engine, the pre-load valve 90 will open and full delivery of the pump will be available to produce pressure against the piston 32 of the servo-motor 15.

If it is further considered that the gear shift lever is in the neutral position, the available pressure will be fully dumped so that the servo-motor A–1 is not actuated and thereby the clutch is maintained disengaged. In the neutral position of the shift lever, the micro-switch 190 has its switch member 196 in the unflexed condition (FIG. 13) and separated from the contact 193. In this condition, the micro-switch has its terminals in the normally closed position and permits the dump valve A–4 to be energized upon turning on the ignition system of the vehicle. With the dump valve energized, the armature 161 is caused to move back into its second position, closing off the opening 165 leading to the atmosphere and opening the neck 156a which permits vacuum pressure to be communicated to the vacuum servo-motor or diaphragm assemblies of A–3. Both of the diaphragm assemblies thereby have a pressure differential across them which permits the valve member 102 to move away from port 100 thereby permitting fluid in the control chamber 77 to return to the chamber 67 of the pump.

Moving the throttle to a more open position will necessarily reduce the amount of vacuum to which the second diaphragm assembly will be subjected. Thus, as the engine speed increases, thereby requiring a greater clutch engaging force, the reduced vacuum will permit a greater effective spring force to urge the valve 102 closed and raise the pressure on control chamber 77.

It should be indicated that while in neutral the over-center spring mechanism is in its center position which would tend to turn the shift tube one way or the other. However, at least one key on the shift tube is aligned with an index slot of the control arms to overcome this tendency and hold the shift lever steady.

If we now assume that the shift lever is moved into first gear position, the switch member 196 will be cammed downwardly as the roller 198 engages the segment 208 of the cam plate rotating with the shift tube 188. In moving the switch member downwardly, the normally closed terminals of the micro-switch 190 are broken, causing the electrical dump valve A–4 to be de-energized and thereby permitting the armature to move back under influence of spring 168 to its second position whereby the vacuum duct 133 is cut off and atmospheric pressure admitted. The valve member 102 will accordingly be caused to move back to close port 100 in response to the action of the spring 122.

In the initial stages of moving into first gear position, and with the control valve closed, available pressure will be delivered to the accumulator valve from chamber 77 through conduit 66 to the inlet passage 42 of the accumulator valve assembly 19. The initial pressure is admitted to the servo-motor chamber 31 in timed sequence by virtue of the accumulator valve assembly so that the clutch will be engaged quickly and in a smooth and gradual manner to avoid abrupt bumps which are experienced in past construction. To achieve these advantages, the accumulator valve, containing a charge of fluid, functions such that the floating disc valve 48 is moved swiftly toward the left in FIG. 3 by application of increased fluid pressure to conduit 66. The charge of fluid enters chamber 31 rapidly to move piston 32 sufficiently for applying an engaging force to the clutch device. A small amount of fluid is permitted to flow around the periphery of the floating disc valve and between casing wall 38 during this sweeping movement of the floating disc valve, but such amount of fluid is relatively negligible.

To fully engage the clutch, further build-up in fluid pressure is controlled by port 55 in the disc valve and opening 56 in the casing 30 which permits only a gradual flow and a gradual build-up of pressure in the clutch chamber 31. The gradual increase is essentially in two stages, as provided in the preferred embodiment. The temperature responsive strip 58 is sprung back by in-flow of oil to the servo-motor until pressures in cavities 31 and 38 are equalized, at which time oil flow is restricted solely trough port 55; assuming the oil to be cold. It is significant that the floating disc valve is located in its first position, at the extreme right position of the assembly 19 in FIG. 3, since prior disengagement of the clutch device enables the retraction spring 29 to move lever 18 to the right, thereby bringing piston 32 to its extreme right position and forcing fluid backwardly through the accumulator valve assembly. In doing so, the backwash of the fluid is sufficient to force the disc valve member to its first position. The disc valve will normally be found in one or the other of said extreme positions since spring clip 54 tends to hold it stationary on the pin shaft 45 until a positive fluid force acts thereagainst.

*Engaging pressure as controlled by engine conditions*

The amount of pressure within the servo-motor A–1 and which is available for providing a clutch engaging force will build up in a manner as geographically shown in FIG. 9. Between generally zero and 10 p.s.i. in control chamber 77, not only will the relief port be closed but the by-pass orifice within valve member 102 will be closed by the ball check valve thereby causing the pressure built up in chamber 77 to be substantially linear as engine speed increases. Above a certain pressure, here chosen as 6 p.s.i., the ball check valve will open and therafter pressure build up will be in accordance with engine speed as modulated by three other factors.

First, the engaging pressure will vary in accordance with the torque being supplied by the engine B since an increase in engine torque is manifested by an increase in the engine manifold pressure (or decrease in manifold vacuum) which is supplied to the second diaphragm assembly 134. Thus, a high engine torque will result in a pressure in the second chamber portion 142 which will be close to atmospheric; substantially, the full effect of the second spring 123 will be employed in augmenting the holding of the valve member 102 in the closed position. A decrease in engine torque will result in a decreased pressure to counteract some or all of the effect of the secnd spring 123 to decrease the closing effort exerted on the valve member 102 and thereby allow fluid pressure in the control chamber to be more readily bypassed to the exhaust chamber and thence to the chamber 67 of the pump. Thus, a gradual increase in engaging pressure is afforded by the opening of the throttle B–1. It will be readily seen that this is a very desirable feature in that the clutch will be engaged by greater force when a greater engagement force is required such as when a greater amount of torque is being transmitted from the engine B through the clutch device and the transmission C to the vehicle driving wheel.

This variation in amount of vacuum which will regulate the amount of spring pressure acting on the valve member 102 at all times will provide a variance in the leveling-off pressure which is achieved when the pressure in the sensing chamber equals the available spring force to open port 100. This is clearly shown in FIG. 9. If the accelerator pedal is not depressed, the throttle will be relatively closed and the torque of the engine will be correspondingly low; this will produce a high vacuum in the chamber portion 142 to take out completely the second spring and thus permit only the spring 122 to regulate the maximum pressure in the control chamber. (The maximum engaging pressure achieved under light throttle is that indicated 2nd diaphragm spring).

In the fully opened position of the throttle, a minimum amount of vacuum will be applied to the chamber portion 142 thereby permitting substantially both springs to act against the valve member 102 and maintain a higher maximum pressure in the sensing chamber, labeled 1st, 2nd diaphragm springs in FIG. 9. Any intermediate position of the throttle will accordingly achieve intermediate leveling off of the sensing chamber pressure.

A second modulating factor on the pressure build-up is construction of the by-pass orifice. As has been indicated earlier, the provision of the by-pass orifice provides for an immediate clutch drag when the vehicle is started in first or reverse. Since the pressure drop through the orifice varies directly as the square of the flow rate therethrough (flow through a thin plate orifice) and since the pump means 65 tends to increase the flow delivered to the control chamber 77 directly with increase in engine speed, the by-pass orifice will modulate the pressure increase in the sensing chamber 77 in a manner such that the increase in engagement pressure transmitted to the servo-motor 15 will vary approximately in proportion to the square of the engine speed. Such increase will graphically be hyperbolic as shown in FIG. 9. Thus, the engine cannot stall and cannot run too fast when the thin plate by-pass orifice is properly calibrated.

*Shifting from one gear to another*

In shifting the transmission from first to second or from any gear position to another, the specially devised switch means A-5 and the electrically operated dump valve A-4 is brought into play to achieve a precise timing of clutch disengagement and re-engagement with change of transmission gears. The amount of lost motion permitted by the narrow neck 227 of the shift tube keys while aligned with one of the control arms of the transmission is the amount that the operator may move the gear-shift lever without affecting the transmission. During this lost motion travel, the cam will be turned as the shift tube motion of the shift tube during this lost motion travel rotates to release the switch member from a depressed or flexed condition in which the switch is open. For example, the cam may be rotated so that the roller 198a will pass from engagement with camming segment 208 (first gear position) to the free space between the segments of the cam. With switch member raised as in FIG. 13, the dump valve will be energized, wherein the port leading to the atmosphere is closed off and full vacuum is permitted to flow also to the first diaphragm assembly. With full vacuum being admitted to both of the diaphragm assemblies, the springs 122 and 123 normally biasing the control valve to closed position are overcome regardless of any position of the throttle and the clutch engaging pressure is dumped.

As the gear shift lever completes its range of angular travel, the narrow portion 227 of a shift tube key engages the sides of one index slot so that the related control arm may be rotated, thereby shifting gears within the transmission. During the completion travel, the shift tube will be rotated sufficiently to bring the cam follower into engagement with another segment of the cam plate, corresponding to the desired gear position, and the switch 190 will again be broken and the armature will move to the left under the influence of spring 168 in FIG. 10 to close off the duct 133. Should the gear shifting operation entail moving the shift tube axially, then the larger portion of the keys will be brought into play so that relatively little lost motion is permitted between the sides of index slots of the control arms and the keys during the crossover motion.

In all of the gear positions, the shift tube and cam will be urged by the over-centering spring mechanism to take up all the lost-motion between the keys and the control arms in the direction of the instant gear position. This will insure that upon turning the shift tube oppositely to go to another gear position, full lost-motion travel will be available to achieve adequate disengagement before shifting the transmission. The over-center spring mechanism also holds the shift-lever and shift tube against accidental movement.

*Hill-braking*

While the car is in gear, and the vehicle is going downhill while coasting on a level while the throttle position is very light, thereby producing a large vacuum, it is desirable to employ the engine braking effect. To do so, there must be a residual pressure maintained in the control chamber to provide adequate clutch drag. In such a situation, it is desirable that the clutch drag be sufficient to maintain a power train between the wheels and the engine, regardless of the speed of the vehicle. To this end, the ball check valve controlling the by-pass orifice closes under influence of spring to insure a residual pressure, here approximately 6 p.s.i.

The check valve is also useful in maintaining a residual pressure so that at engine idle, drive-line backlash will be taken up by having the clutch dragging to avoid any initial take-up thump when the clutch is positively engaged. The ball check-valve maintains the pressure in the control chamber slightly higher than that necessary to overcome the retractor spring 29 and springs in the clutch.

In the instance where the engine is started and gear shifting takes place when the engine oil is cold, the thermostatic valve means 115 is actuated by the cold oil to open port 116 in the clutch control outlet 75 so that the heavier oil is permitted to drain outwardly and return to the pump to compensate for the excess viscosity. Similarly, the servo-motor housing is provided with a temperature responsive valve which permits oil to drain or fill through an extra opening to compensate for the added heavier viscosity of the oil. The amount each of these openings will be unrestricted depends upon the position of the thermostatic valve and the corresponding temperature.

While we have described our invention in connection with certain specific constructions and arrangements, it is to be understood that this is by way of illustration and not by way of limitation and the scope of our invention is defined solely by the appended claims which should be construed as broadly as the prior art will permit.

We claim:

1. A control mechanism for a clutch device, comprising: a fluid operated clutch actuator operably connected to said clutch device; means for supplying a first pressurized fluid to said actuator and having conduit means interconnecting said supply means with said fluid actuator, said actuator having a volumetric phasing means for providing said actuator with at least two phases of operation upon application thereto of fluid pressure from said fluid supply means, one phase of operation permitting a volume limited initial surge of fluid pressure to enter said actuator for providing an initial soft engagement of said clutch device and a second phase of operation permitting a gradual increase in fluid pressure in said actuator to provide a fuller clutch engagement; a primary valve control means interposed in said conduit means for regulating the first fluid pressure applied to said actuator in order to effect engagement and disengagement of said clutch device, said control valve means comprising a casing having a relief port adapted to return fluid in said conduit means back to said fluid supply means and having a valve control element for regulating the flow therethrough biased by the first fluid pressure therein, means normally biasing said control element counter to said first fluid pressure to a position for restricting said relief port thereby promoting clutch engagement; means for applying a second fluid force to overcome the effect of said biasing means; manual means movable between a plurality of discrete positions and employing a unitary switch actuated by said manual member at each of said discrete positions; electrically operated means responsive to the actuation of the unitary switch for selectively controlling the application of said second fluid force for promoting disengagement of said clutch device means defining a bypass orifice for communicatings said conduit means with said fluid supply means for returning fluid back thereto, said bypass orifice being adapted dimensionally to permit flow therethrough in order to provide a hyperbolic build up in pressure in said conduit means in accordance with increases of pressure from said fluid supply means; and a preload valve means for maintaining said bypass orifice closed until a predetermined pressure is reached within said conduit means, thereby enabling said clutch device to be lightly engaged when the pressure of said supply member is below said predetermined value.

2. In a power supply system including an internal combustion engine and an intake manifold, a transmission comprising a drive member driven by said engine, a driven member, mechanism for providing a purality of speed ratios between said members and including a friction engaging device for completing a power train therethrough, a casing having control chamber therein, a pump driven by said drive member for supplying a first pressurized fluid to said chamber, a primary valve control means responsive to pressure in said control chamber for returning fluid to the intake of said pump and thereby regulate the maximum engine pressure for said device and having auxiliary means for restricting the flow of fluid back to the pump to maintain a minimum predetermined fluid pressure in said control chamber, said valve control means comprising a servo-mechanism fluidly connected to said control chamber for applying engaging force to said engaging device graduated in accordance with the first fluid pressure in said chamber, by-pass means for applying the vacuum of the intake manifold of said engine to a portion of said control means permitting said control means to move to a position for fully returning the first fluid pressure to said pump, and a manually controlled mechanism operatively associated with said vacuum applying means and with said speed changing mechanism, said manually controlled mechanism being movable to a plurality of discrete positions corresponding to a plurality of speed ratios for said power train and including a lost motion device for permitting initial movement of the mechanism between speed ratio positions to actuate said vacuum of applying means for releasing the engaging force on said engaging device in advance of effecting a different speed ratio.

3. For use in a power supply system including an internal combustion engine with an intake manifold and a friction engaging device for transmission of torque from the engine to a driven member, mechanism for controlling engagement of the engaging device comprising a positive displacement pump driven by said engine, a casing having a control chamber for receiving the output from said pump, a primary valve control means for regulating the pressure in said control chamber, a hydraulic servo-mechanism fluidly connected to said control chamber for applying engaging force to said engaing device graduated in accordance with the fluid pressure in said control chamber, biasing means associated with said primary valve control means for urging the same toward closed position, means normally communicating a second fluid pressure varying in accordance with the vacuum of said intake manifold of said engine to a portion of said primary valve control means to modulate the latter means to a position always above a minimum engaging force, manually operated means for selectively applying said second fluid pressure force to another portion of said primary control means to permit the exhaustion of the first fluid pressure in said control chamber for promoting disengagement of said device, and bypass means for returning first fluid pressure back to said supply and including a thin plate orifice communicating said supply and said control chamber whereby the pressure in said control chamber will increase in accordance with the square of the speed of said pump or said engine, said by-pass means being particularly characterized in that said orifice is formed within said primary valve control means and has a pre-load valve means therein adapted to maintain said orific in a closed condition until a predetermined pressure is reached in said control chamber, said preload valve means maintaining a residual pressure in said control chamber so that the engaging device will be lightly engaged with the engine is at a relatively low speed to provide a hill braking effect and also to avoid the initial thump upon increasing the engine speed for fully engaging the friction engaging device.

4. A clutch control adapted for use in a self-propelled vehicle having an engine, a manually operated throttle means for controlling the speed of said engine, a driven shaft, a friction clutch for establishing drive between said engine and shaft having yieldable clutch release means urging the clutch members out of engagement, comprising a fluid pressure operated mechanism for effecting clutch engagement, a source of fluid pressure communicating with said mechanism having a fluid flow rate increasing with engine speed, means defining a by-pass orifice also communicating with said mechanism for by-passing fluid back to said fluid source and adapted to graduate the increase of pressure supplied to said mechanism in accordance with the square of the engine speed, a preload valve means adapted to block the flow of fluid through said orifice when the pressure in said mechanism decreases to an extent slightly greater than the force of said yieldable clutch release means so that a residual pressure will be maintained in said mechanism for providing a hill braking effect and to maintain the clutch slightly dragging when the engine speed is relatively low to avoid an initial thump upon increasing the engine speed rapidly, and means for relieving the pressure in said mechanism for dis-engaging the clutch.

5. A drive engagement control apparatus adapted for use in a self-propelled vehicle having an engine and a manually operated throttle means for controlling the speed of said engine, said apparatus comprising: a driven shaft and gradually engageable coupling means for establishing drive between said engine and shaft, a fluid pressure operated mechanism for effecting engagement of coupling means, a source of fluid pressure communicating with said mechanism having a fluid flow rate increasing with engine speed, said mechanism having means defining a relief port adapted to return fluid pressure back to said source, means responsive to the operation of said throttle means for establishing a second source of fluid pressure, a primary valve control means adapted to control fluid passage through said relief port and having said first fluid pressure normally urging said valve control means to an open position with a biasing means urging said valve control means to a closed position; means communicating said second fluid source with said primary valve control means for opening said port in opposition to said biasing means, an electrically operated dump valve adapted to control the communication of said second fluid pressure source to said primary valve control means for regulating the application thereof, and manually operated means movable to a plurality of discrete positions and having a switch actuated in said positions to control the energization of said electrically operated dump valve for disengaging said coupling means.

6. For use in a power supply system including an internal combustion engine with an intake manifold and a friction engaging device to provide for transmission of torque from the engine to a driven member, mechanism for controlling engagement of the engaging device, comprising: means for supplying a first pressurized fluid, a casing having a control chamber for receiving said fluid, a primary valve control means for regulating the fluid pressure in said chamber, a servo-mechanism fluidly connected to said chamber for applying engaging force to said engaging device graduated in accordance with the fluid pressure in said chamber, biasing means for urging said control means in a direction for increasing the pressure in said chamber, means for modifying the action of said biasing mechanism and including means for applying the pressure from the intake manifold of said engine to a portion of said control means whereby the first pressure in said chamber increases in response to increases in the manifold pressure of the engine, said modifying means further including means for selectively applying the pressure from the intake manifold of said engine to the other portions of said control device whereby the full effect of said biasing mechanism may be overcome, a source of atmospheric pressure, electrically operated dump valve means for selectively controlling application of said manifold pressure and atmospheric pressure to said other portions of said control device.

7. A clutch control mechanism as in claim 1, in which said mechanism is adapted for control of a clutch device for an automotive vehicle having a transmission with a change-speed gear means operated by movement of a shift-lever, the switch of said mechanism being responsive to a change in position of said shift-lever to operate said electrically operated means and wherein said switch employs a cam having contours spaced in accordance with discrete speed-ratio positions of said lever, and a cam follower for operation of said switch, one of said cam or cam follower being adapted to move in response to movement of said shift-lever to actuate said cam follower only in said discrete positions.

8. A clutch control mechanism as in claim 1, in which said mechanism is adapted for control of a clutch device for an automotive vehicle having a transmission with a change-speed gear means, said last-named means including a shift tube housing and a shift tube disposed therein and adapted to be rotationally and axially movable in response to movement of said shift-lever for accomplishing a change in speed of said transmission, the switch means of said mechanism comprising a micro-switch, a cam-plate mounted on said shift tube, and a cam follower on said micro-switch for engaging said cam-plate and thereby actuate said switch upon relative movement of said cam follower along said cam-plate, said micro-switch being fixedly mounted on said shift tube housing whereby said micro-switch may be operated in response to a change in position of said shift-lever which in turn moves said shift tube and cam-plate.

9. A clutch control mechanism as in claim 1 in which said mechanism is adapted for control of a clutch device for an automotive vehicle having a transmission with change-speed gear means including a shift tube moveable in response to movement of a shift-lever, said vehicle having a cylindrical jacket tube with said shift tube generally disposed concentrically therein for both rotative and axial movement in response to operation of said shift-lever, said jacket tube having an opening therein, the switch means of said mechanism comprising a micro-switch fixedly mounted on said jacket tube, an arcuate cam-plate fixedly mounted on said shift tube and extending radially outwardly through said opening in said jacket tube, and a cam follower on said micro-switch for engaging said cam-plate to operate said switch.

10. A clutch control mechanism as in claim 1, in which said mechanism is adapted for control of a clutch device for an automotive vehicle having an internal combustion engine and a transmission with change-speed gear means including a shift tube moveable in response to movement of a shift-lever, said vehicle having an electrical ignition system with an electrical ground circuit, said automotive vehicle further having a cylindrical jacket tube provided with an opening at an intermediate portion thereof, and having a shift tube disposed concentrically therein and adapted for rotative and axial movement in response to a change in position of said shift-lever, the switch means of said mechanism comprising a micro-switch fixedly mounted on said jacket tube, an arcuate cam-plate having a plurality of camming segments and being fixedly mounted on said shift tube and extending through said opening in the jacket tube and a cam follower on said switch adapted to engage said cam-plate for actuating the micro-switch, said micro-switch being electrically associated in series in said ground circuit of said ignition system so that said electrically operated means can be energized only when the ignition system is operational.

11. A clutch control mechanism as in claim 1, in which said electrically operated means comprises a valve assembly with a solenoid actuator for control of said fluid-operated overriding means, said valve assembly having an electrically conductive casing with spaced first and second inlets in communication with a first pressure supply and an atmospheric pressure supply respectively, said casing having an outlet in communication with said overriding means, a valve member disposed in said casing and moveable between a first position in which said 1st port is closed and said 2nd port is open and a second position in which said 1st port is open and said 2nd port is closed, said valve member being adapted to maintain said outlet means open in both positions thereof, resilient means urging said valve member toward said first position, said valve member having at least one integral portion thereof comprising ferro-magnetic material for functioning as an armature, and an electrical winding about said casing connected with a source of energy and adapted to move said portion and said valve member toward said second position upon energization, said ferro-magnetic portion and said winding comprising said solenoid actuator.

12. A clutch control mechanism as in claim 1, in which said electrically operated means comprises a valve assembly with a solenoid actuator for control of said fluid-operated overriding means, said valve assembly having an electrically conductive casing with first and second inlets at opposite ends of said casing and said inlets being in communication with a first pressure supply and an atmospheric pressure supply respectively, said casing having an outlet in communication with said overriding means, a valve member disposed in said casing and moveable between a first portion in which said 1st port is closed and 2nd port is open and a second position in which said 1st port is open and said 2nd port is closed, said valve member fitting snugly against the inner wall of said casing for sliding movement therealong and having longitudinally extending grooves therein adapted to maintain said outlet means open in both positions of said valve, resilient means urging said valve member toward said first portion, said valve member having at least one integral portion thereof being comprised of ferro-magnetic material to function as an armature, and an electrical winding about said casing connected with a source of energy and adapted to move said portion and said valve member toward said second position upon energization, said ferro-magnetic portion and said winding comprising said solenoid actuator.

13. A mechanism as in claim 6, which further comprises manual means for actuation of said switch means, said manual means comprising a shift tube rotatably and longitudinally movable about the axis of said tube between discrete positions, said shift tube having at least one key formed thereon, lost motion linkage means operatively connecting said speed changing means with said tube key, said switch means being responsive to lost motion movement of said tube relative to said speed changing means for energizing said electrically operated dump valve means in advance of effecting a speed change.

14. A transmission as in claim 13, in which said lost motion linkage means includes a pair of spaced control arms each having one end connected with said speed changing means and an opposite end carried by said shift tube, each of said control arms having a central opening through which said shift tube extends and having an index slot, said shift tube having a pair of axially spaced keys, each of said keys having a wide portion commensurate with the width of said index slot and a narrow portion to provide a degree of rotary motion between the shift tube and the slot sides before the control arms are actuated, said wide portions providing a guide to align said shift tube keys with respect to said control arm slots.

15. A transmission as in claim 13, in which said manual means comprises a jacket tube mounted concentrically with respect to said shift tube, said switch means being more particularly characterized by a cam carried by said shift tube for movement therewith, said cam having a plurality of camming segments spaced in accordance with the discrete positions of said tube, said switch means having a cam follower actuatable in response to movement of said shift tube between said discrete positions for controlling energization of said dump valve.

16. A transmission as in claim 6, in which said electrically operated dump valve is particularly characterized by the combination comprising: a valve housing having a cylindrical chamber therein with an inlet for manifold pressure an inlet for atmospheric pressure and an outlet normally communicating with said modifying means, said inlets being at disposed opposite ends of said chamber, said housing further having an outlet, and armature means slidably disposed in said chamber defining circumferentially spaced passages in cooperation with said housing and having valve portions at its opposite ends thereof for closing off one of said inlets according to the axial position of the armature means to one of said inlet closing positions, and electrically energizable coil means for selectively urging said armature means to other of said inlet closing positions.

References Cited by the Examiner
UNITED STATES PATENTS

| | | |
|---|---|---|
| 2,203,296 | 6/1940 | Fleischel. |
| 2,472,694 | 6/1949 | Chouings. |
| 2,755,774 | 7/1956 | Floyd _______________ 121—38 |
| 2,756,851 | 7/1956 | Collins. |
| 2,848,080 | 8/1958 | Binder ____________ 192—.052 |
| 2,870,744 | 1/1959 | Halerstrom __________ 121—38 |
| 2,893,526 | 7/1959 | Smirl _____________ 192—.052 |
| 2,894,526 | 7/1959 | Booth et al. ________ 137—512.2 |
| 2,898,934 | 8/1959 | Britt _____________ 137—512.2 |
| 2,979,171 | 4/1961 | Bland et al. ________ 192—.052 |

DAVID J. WILLIAMOWSKY, *Primary Examiner.*

BROUGHTON G. DURHAM, *Examiner.*

P. W. SULLIVAN, *Assistant Examiner.*